United States Patent
Horton

(10) Patent No.: US 6,322,302 B2
(45) Date of Patent: Nov. 27, 2001

(54) SNAP BUCKLE TOOL

(76) Inventor: Thomas E. Horton, Rte. 1, Box 81, Eure, NC (US) 27935

( * ) Notice: Subject to any disclaimer, the term of this patent is extended or adjusted under 35 U.S.C. 154(b) by 0 days.

(21) Appl. No.: 09/062,020

(22) Filed: Apr. 17, 1998

Related U.S. Application Data

(60) Provisional application No. 60/045,499, filed on May 2, 1997.

(51) Int. Cl.[7] .............................. B60P 7/08; G05G 1/00; B25F 1/00
(52) U.S. Cl. .......................... 410/100; 410/96; 410/103; 410/156; 7/166; 254/25; 16/114 R; 74/544
(58) Field of Search .............................. 410/96, 97, 100, 410/103, 156; 24/68 CD, 68 CT; 7/166, 168; 254/DIG. 3, 25; 16/114 R; 74/544, 545; 81/177.2, 489

(56) References Cited

U.S. PATENT DOCUMENTS

| | | | |
|---|---|---|---|
| D. 199,019 | * 8/1964 | Marson | 7/166 X |
| 1,486,820 | * 3/1924 | Wilder | 254/25 |
| 3,119,278 | * 1/1964 | Simpson | 74/544 X |
| 3,864,769 | * 2/1975 | Hamilton | 74/544 X |
| 3,893,200 | * 7/1975 | Wanciak | 7/166 X |
| 4,112,530 | * 9/1978 | Lecce et al. | 7/166 X |
| 4,236,427 | * 12/1980 | Becnel | 254/131 |
| 4,297,916 | * 11/1981 | Burroughs | 74/544 |
| 4,362,071 | * 12/1982 | Coker | 81/3.46 R |
| 4,510,651 | * 4/1985 | Prete, Jr. et al. | 16/114 R |
| 4,583,429 | * 4/1986 | Kroeger et al. | 81/3.55 |
| 5,429,463 | * 7/1995 | Howell | 410/156 |
| 5,433,565 | * 7/1995 | Chan | 410/103 |
| 5,494,387 | * 2/1996 | Ruegg | 410/103 |
| 5,524,505 | * 6/1996 | Lawrence | 74/544 |
| 5,549,429 | * 8/1996 | Sergent | 410/96 |

* cited by examiner

Primary Examiner—Stephen T. Gordon
(74) Attorney, Agent, or Firm—Mills Law Firm PLLC

(57) ABSTRACT

An improved snap buckle tool for opening and closing a snap buckle of the type used in combination with a flexible strap member to adjust the tension thereof is disclosed. The snap buckle tool comprises an elongated handle member integrally formed with a generally C-shaped head member. An elongated slot divides the terminal end of the head member into a pair of parallel tines which engage a snap buckle to alternately manipulate the snap buckle from a closed condition to an open condition to adjust the tension of the strap. The slot is disposed at a predetermined angle relative to a longitudinal axis of the handle member to facilitate use of the tool against a surface of a shipping container to gain a mechanical advantage in opening and closing the snap buckle.

5 Claims, 2 Drawing Sheets

SNAP BUCKLE TOOL

CLAIM OF BENEFIT OF PROVISIONAL APPLICATION

This Application claims the benefit under the 35 U.S.C. 119(e) of United States Provisional Application No. 60/045,499 filed May 2, 1997 by Thomas E. Horton for Snap Buckle Tool.

BACKGROUND OF INVENTION

Field of Invention

This invention relates to strap tightening mechanisms such as those associated with securing cargo packages and, more particularly, to a snap buckle device for tightening a woven strap about an object such as a ceramic mold; and a tool for engaging and disengaging the snap buckle device.

So-called snap buckles for tightening a woven strap or belt about a cargo package or various other objects are well known to those skilled in the art. The snap buckle is fixedly attached to the belt at one end thereof and the opposite end of the belt is fed through the belt tightening mechanism of the snap buckle device so as to encircle and secure the object.

In a slackened condition, the belt is drawn through the snap buckle and around the object to be secured. Thereafter, the snap buckle is typically folded 180° to a tightened condition which takes up the slack in the belt in order to secure the object.

In the conventional practice such a snap buckle is difficult to operate manually. Typically, the snap buckle tightening mechanism requires that a user pivot the so-called "tongue" of the snap buckle using the hand and fingers. This tightening action can become very painful to the user even in the best of conditions due to the pressure required to operate the snap buckle. Further, there is a transition point in the tightening process at which the snap buckle actually "snaps" closed and the user has no control over the buckle at all. In the worst case scenario, the user can injure their hand or finger during the tightening process.

Thus, the present invention has been developed to provide the user with a safe and effective tool for controlling the snap buckle tightening operation.

DESCRIPTION OF RELATED PRIOR ART

U.S. Pat. No. 4,236,427 to Larry H. Becnel discloses a toggle latch opening and closing tool for use with at least two different types of container toggle latches. This tool comprises a generally L-shaped shank portion having first and second diverging legs integrally joined together at one end and a handle secured to the free end of the first leg.

U.S. Pat. No. 5,549,429 to Delores A. Sergent discloses a ratchet operating tool for a strap tightening mechanism such as those associated with cargo securing harnesses. The tool comprises a handle having a first end a socket adapted to engage the lever of the ratching mechanism and, at an opposite second end, a tongue adapted to unlock the ratcheting mechanism. A U.S. Pat. No. 3,864,769 to Monroe H. Hamilton discloses a buckle operating means for moving a ski boot buckle into and out of holding positions. The device comprises a lever body having spaced-apart gripper sides formed at one end thereof for engaging an extremity of a buckle prong. A lever arm portion extending outwardly from one of the gripper sides provides a handle part through which manually applied pressure can be exerted to move a buckle prong.

U.S. Pat. No. 4,510,651 to Ernest Prete Jr., et al. discloses a ratchet buckle with a removable operating lever for tightening and tensioning straps. The ratchet buckle has a bifurcated frame member with a pair of oppositely positioned parallel arms between which a reel member and ratchet wheels are rotatably mounted and employs a bifurcated handle member having a pair of oppositely positioned parallel arms rotatably mounted on the reel. The handle has a ratchet drive plate which engages the teeth of the ratchet wheels such that when the handle is actuated, the reel is rotatably driven.

U.S. Pat. No. 4,583,429 to Daniel E. Kroeger et al. discloses a unitary opener device for tab-type cans comprising a handle portion adapted to be gripped by a user, and a working end portion having a pair of relatively inflexible nose portions, the nose portions being separated by slot dimensioned to receive the exposed portion of the can opening tab.

U.S. Pat. No. 4,362,071 to Jess M. Coker discloses a can opener for opening tab-type closures comprising a body portion, a head portion, and a handle. A lower lip member and an upper lip member are connected to the proximal end of the head portion. To open the closure of the can, the lower lip member is inserted under the ring member of the closure. The handle is grasped and the body portion is pivoted on the rim of the can to pull the ring member away from the can to completely remove the weakened portion of the closure from the can thereby producing an opening in the end of the can.

SUMMARY OF INVENTION

After much study of the above mentioned problems, the present invention has been developed to provide an improved tool for the manual operation of a snap buckle of the type utilized to secure various shipping containers.

In the conventional practice such a packaging strap is drawn about the container to be secured and inserted through a so-called snap buckle in a slackened condition.

Thereafter, the snap buckle is folded to a closed condition to take up slack in the packaging strap which secures the container to a pallet or directly to a truck or other conveyance for shipping.

Although the opening and closing of such a snap buckle is often carried out by hand or by using common hand tools, injuries often result to a user because the snap buckle literally snaps shut to a closed position and the user has no effective control of the device.

Thus, the improved tool of the present invention is designed to provide controlled operation of the snap buckle during opening and closing thereof.

In view of the above, it is an object of the present invention to provide an improved tool for the operation of a so-called snap buckle used to tighten packaging straps during shipping and handling.

Another object of the present invention is to provide an improved tool for operating a snap buckle which is configured to provide a user with optimum control and leverage during operation of the snap buckle.

Another object of the present invention is to provide an improved tool for opening and closing a snap buckle which reduces the likelihood of injury to a user thereof.

Other objects and advantages of the present invention will become apparent and obvious from a study of the following description and the accompanying drawings which are merely illustrative of such invention.

DETAILED DESCRIPTION OF THE PREFERRED EMBODIMENT

Figure 3:
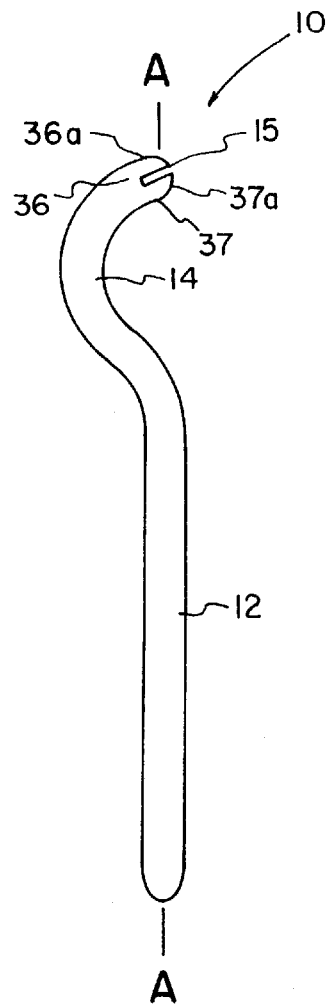
FIG. 3 is a plan view of the improved tool of the present invention utilized to open and close a snap buckle.

With reference to the drawings there is shown therein a snap buckle tool in accordance with the present invention, indicated generally at 10 and illustrated in FIG. 3.

Prior to discussing the details of the construction and function of the tool 10 of the present invention, it may be beneficial to briefly review the structure and function of a so-called snap buckle with which the present invention is designed to be utilized.

Figure 1:
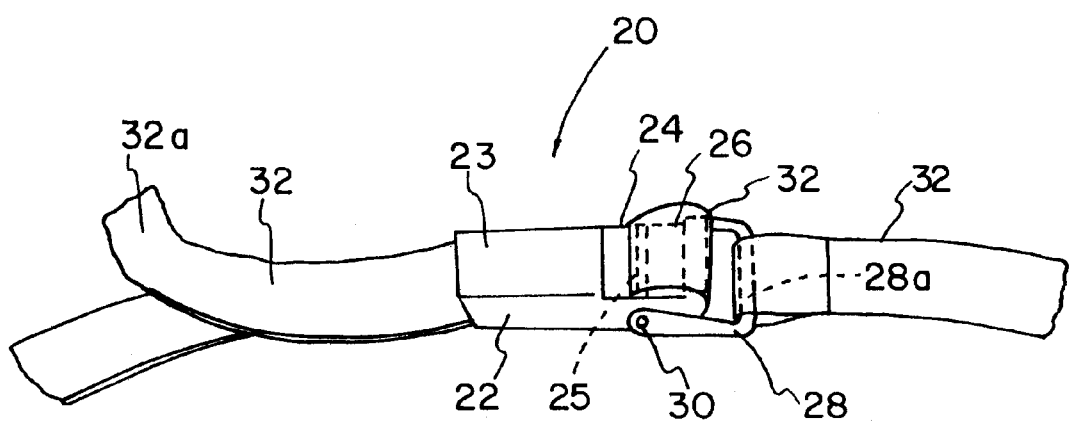
FIG. 1 is a perspective view of a snap buckle shown in a position of engagement with an attached packaging strap.

As shown in FIG. 1, the snap buckle, indicated generally at 20 comprises a generally rectangular body member 22 having a pair of generally parallel central passages 24 and 26 disposed on either side of a transverse post member 25.

The body member 22 is pivotally attached to a generally U-shaped yoke member 28 by pivot pins 30.

In the preferred embodiment all of the hereinabove described components of the snap buckle 20 are fabricated from a metal material such as steel, aluminum or other durable material.

The snap buckle 20 is adapted for use with a strap or belt 32 which is fabricated from a flexible woven material such as nylon or other synthetic material.

The belt 32 is looped around the center portion 28a of the yoke member 28 and secured thereto by stitching or other fastening means to permanently capture the yoke member 28 at a first end of belt 32.

Figure 2:
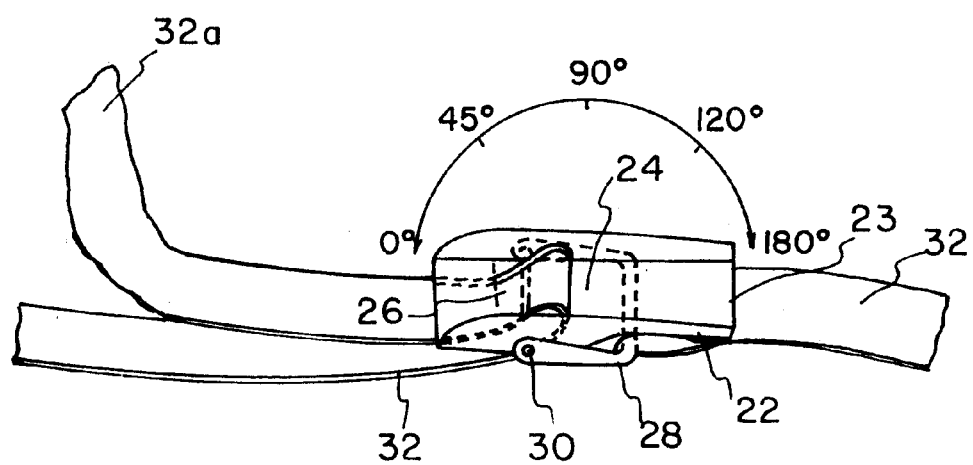
FIG. 2 is a perspective view of the snap buckle depicted in FIG. 1 shown in a position of disengagement with a packaging strap.

In practical use the opposite, free end 32a of the belt 32 is first inserted through the passage 24, looped over the post member 25, and drawn back through the passage 26 folding the belt 32 180° onto itself to the open or slackened condition shown in FIG. 2. In this open position the belt 32 may be drawn snugly around the object to be secured by hand pressure.

To engage the snap buckle manually, the user would pivot the tongue portion 23 of the snap buckle 20 from the open position to about the 120° position shown in FIG. 2 and place the palm of their hand on the tongue 23 and push towards the closed or 0° position as seen in FIG. 2. Normally there should be little or no pressure on the belt 32 between the open position and the 120° position.

It will be appreciated by those skilled in the art that applying pressure to the strap at the 120° position would be very difficult, if not impossible, by hand due to the difficulty in pushing the snap buckle 20 through and up to the 90° position shown in FIG. 2.

Thus, it can be seen that manual operation of the snap buckle 20 can become very painful to the user in the best of conditions due to the pressure required to operate the same.

Further, there is a transition point at approximately 30° to 45° from the closed position wherein the snap buckle 20 actually "snaps" shut and the user has no effective control of the device. In the worst case, the user can pinch a finger or hand in the buckle causing serious injury.

Accordingly, the snap buckle tool 10 of the present invention has been devised for this purpose and will now be described. The tool 10 comprises an elongated handle member 12 having a generally C-shaped head portion 14 integrally formed therewith at one end as shown in FIG. 3. The C-shaped head portion 14 facilitates the use of the tool 10 against the surface of a container bearing a snap buckle 20 to be opened as more particularly described hereinafter.

Figure 4:
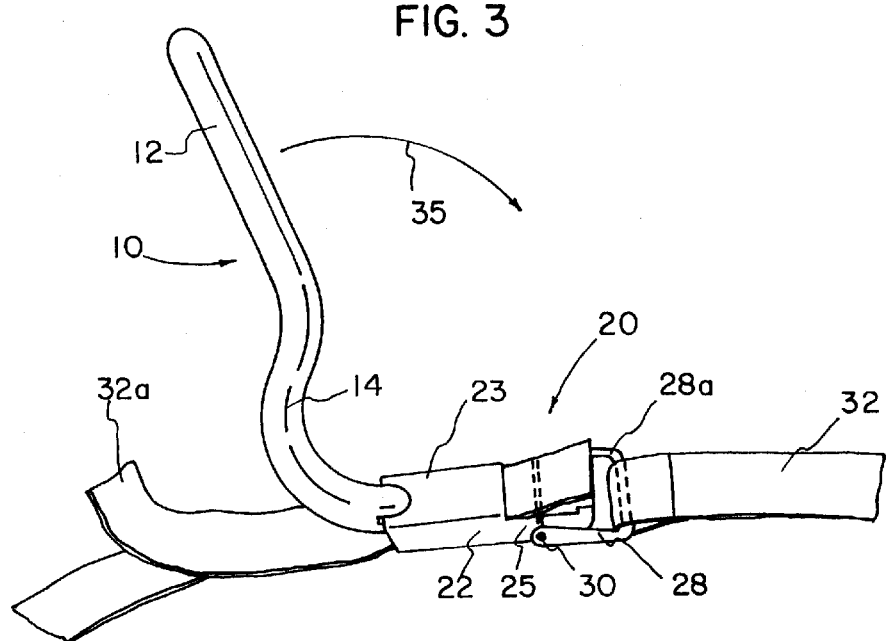
FIG. 4 is a perspective view of the improved tool of the present invention shown in its functional position in engagement with a snap buckle.

A terminal end 14a of the head member 14 includes a generally rectangular slot 15 formed therein which is disposed at a predetermined angle in relation to a longitudinal axis A of the tool 10. In the preferred embodiment the plane of the spaced parallel surfaces defining slot 15 lies at an angle in the range of 110° to 130° relative to the axis A to provide a mechanical advantage to a user during operation thereof. The parallel surfaces lie in planes normal to the handle member 12. Slot 15 divides the terminal end 14a of the head member 14 into a pair of generally symmetrical tines 36 and 37. The tip portions 36a and 37a respectively of tines 36 and 37 are fully radiused to facilitate the engagement of the tongue portion 23 of the snap buckle 20 as shown in FIG. 4. As shown in FIG. 3, the terminal end of the head portion 14 terminates adjacent the longitudinal axis A. Further, it will be noted that the notch or slot 15 is formed centrally in the terminal end of the head portion 14.

It will be appreciated that the slot 15 is dimensioned to be slightly larger than the thickness of the tongue portion 23 to slidingly engage the same during use.

In the preferred embodiment tool 10 is fabricated from a metal material such as steel, aluminum or other suitable material of sufficient strength. Typical dimensions for the tool 10 are an overall length of about 8-½ inches, about 5-½ inches of which are covered by handle 12 and a length of about 3 inches for the head portion 14. The head portion 14 and the handle 12 measure approximately ½ inch square per side.

If desired, the handle 12 can be provided with a hand grip (not shown) for the comfort and convenience of the user. The hand grip can be of the tubular plastic type of a relatively larger diameter than the handle 12 which can be easily slid thereon to provide an enhanced grip to the user.

Since such tubular hand grips are well known to those skilled in the art, further detailed discussion of the same is not deemed necessary.

In order to release the snap buckle 20, the tool 10 is disposed on the buckle 20 such that the slot 15 engages the tongue portion 23 as shown in FIG. 4. The tool 10 is drawn toward the yoke member 28 and acts as a lever forcing or prying the tongue 23 upwardly and toward the yoke member 28 to the fully open position as indicated by the directional arrow 35 thereby slackening the belt 32.

When it is desired to tighten the belt 32 about a container or another object, the sequence described above is merely reversed, tool 10 first engaging the tongue 23 and then being rotated to pivot the tongue upwardly and to the fully closed position shown in FIG. 4.

From the above, it can be seen that the snap buckle handle tool of the present invention provides a practical and efficient alternative to manual operation of a conventional snap buckle for tightening a belt around cargo packages and other items such as a ceramic mold.

The snap buckle handle tool easily engages and disengages such snap buckles with minimal physical effort and without injury to the user.

The terms "upwardly, downwardly, and so forth have been used herein merely for convenience to describe the present invention and its parts as oriented in the drawings. It is to be understood, however, that these terms are in no way limiting to the invention since such invention may obviously be disposed in different orientations when in use.

The present invention may, of course, be carried out in other specific ways than those herein set forth without departing from the spirit and essential characteristics of such invention. The present embodiments are, therefore, to be considered in all respects as illustrative and not restrictive, and all changes coming within the meaning and equivalency range of the appended claims are intended to be embraced therein.

What is claimed is:

1. An actuating tool for a pivoting a release plate of snap buckle closure, said actuating tool comprising;

an elongated unitary body having an arcuate actuating portion integrally connected with a linear handle portion and lying in a common plane therewith, said actuating portion having an open transverse notch formed therein at a terminal end thereof, said notch being defined by a pair of spaced parallel bearing surfaces having a distance therebetween for providing a sliding fit with said release plate of said snap buckle, said surfaces lying in planes normal and bearing an obtuse angle with respect to said handle portion.

2. The actuating tool as recited in claim 1 wherein said handle portion has a longitudinal axis and said bearing surfaces of said notch transversely intersect said longitudinal axis.

3. The actuating tool as recited in claim 2 wherein said obtuse angle is in the range of about 110° to 130°.

4. The actuating tool as recited in claim 2 wherein said terminal end of said actuating portion terminates adjacent said longitudinal axis.

5. The actuating tool as recited in claim 4 wherein said notch is formed centrally in said terminal end of said actuating portion.

* * * * *